No. 888,331. PATENTED MAY 26, 1908.
W. R. MARTIN.
BRICK CONVEYER.
APPLICATION FILED MAY 17, 1907.
3 SHEETS—SHEET 1.
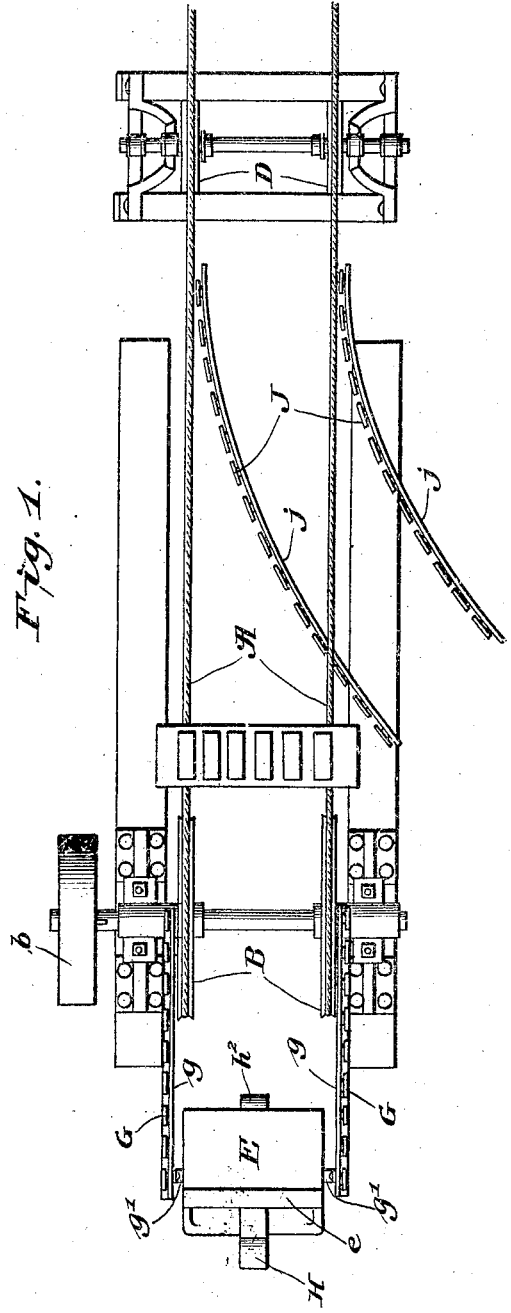
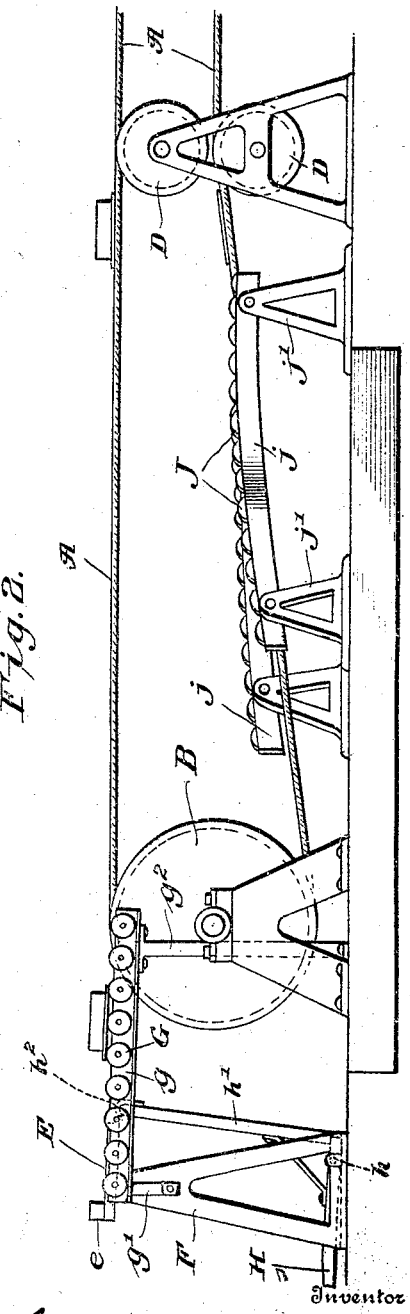

No. 888,831. PATENTED MAY 26, 1908.
W. R. MARTIN.
BRICK CONVEYER.
APPLICATION FILED MAY 17, 1907.
3 SHEETS—SHEET 2.
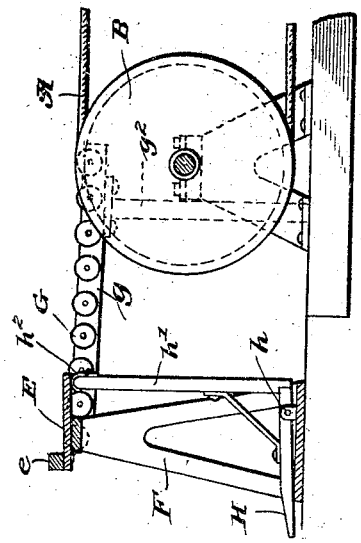
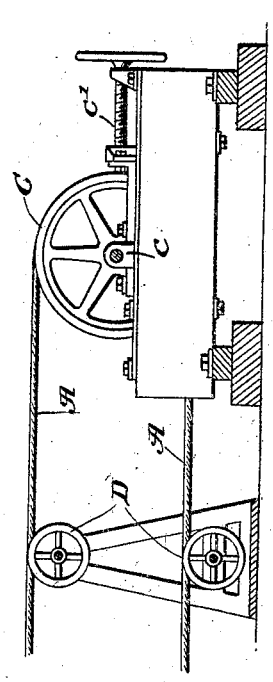
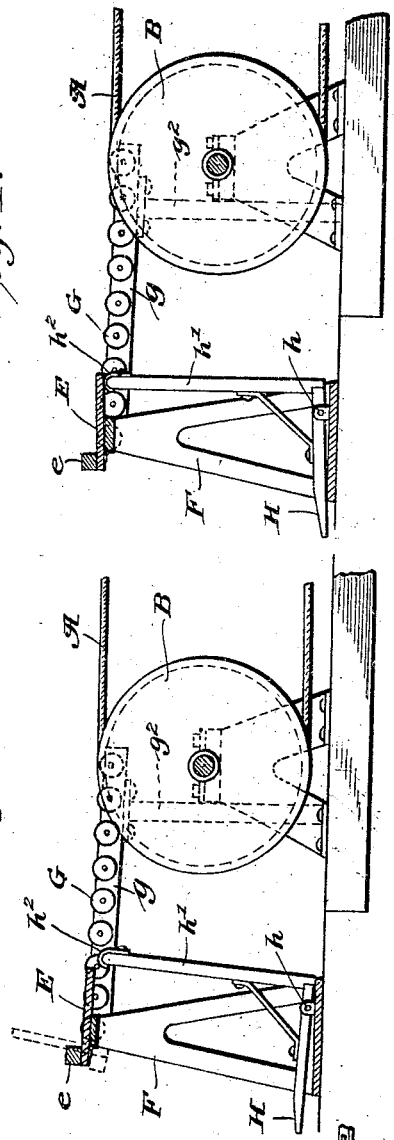
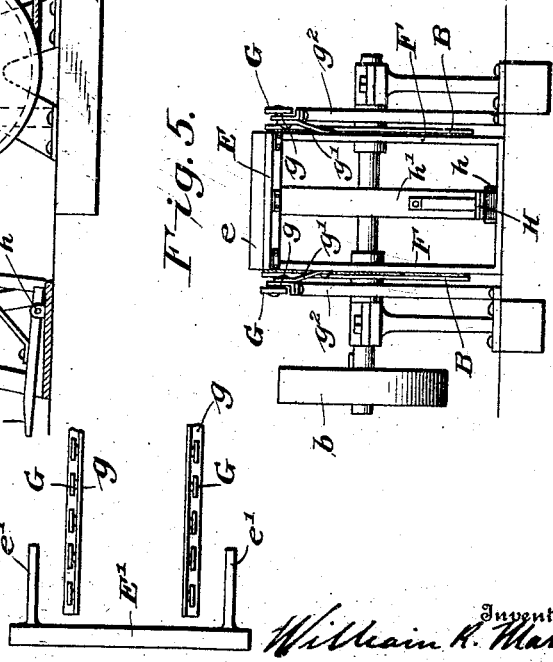
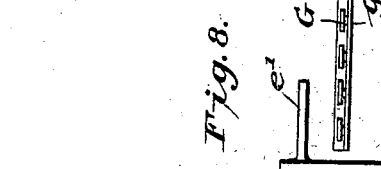
Witnesses
Inventor
William R. Martin
By
Attorneys

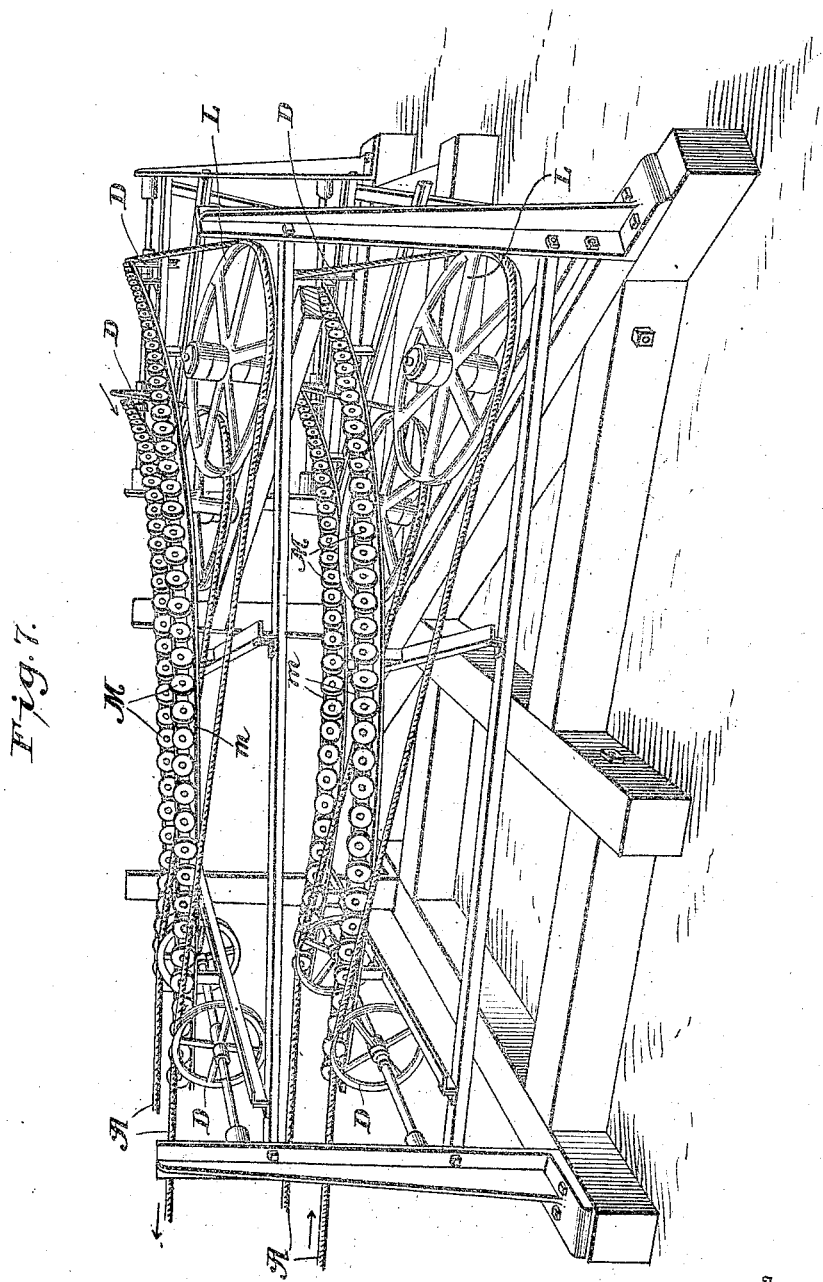

UNITED STATES PATENT OFFICE.

WILLIAM R. MARTIN, OF LANCASTER, PENNSYLVANIA.

BRICK-CONVEYER.

No. 888,831.   Specification of Letters Patent.   Patented May 26, 1908.

Application filed May 17, 1907. Serial No. 374,176.

*To all whom it may concern:*

Be it known that I, WILLIAM R. MARTIN, a citizen of the United States, residing at Lancaster, in the county of Lancaster and State of Pennsylvania, have invented certain new and useful Improvements in Brick-Conveyers; and I do hereby declare the following to be a full, clear, and exact description of the invention, such as will enable others skilled in the art to which is appertains to make and use the same.

This invention relates to conveyers, and more particularly off-bearing conveyers used in brick-yards or plants for transporting pallets of brick to and from the driers or elsewhere.

In a modernly equipped plant, as exemplified in my prior applications Serial Nos. 306,686 and 367,045, where an off-bearing belt or endless cable conveyer runs from the brick-machine to and through the drying-house or between the drying racks, the green brick as they are taken in molds from the brick-press or molding machine are received or dumped upon suitable pallets or trays, which are deposited either manually or mechanically upon the head end of the conveyer and carried off thereby to the driers, where workmen are stationed to remove the pallets and place them upon the drying shelves or racks. After drying, the pallets of dried brick are taken from the racks and replaced upon the conveyer for transportation to the kilns, and the empty pallets, after the dried brick have been dumped or removed therefrom, are placed upon the lower run of the conveyer and returned thereby to the original loading station in proximity to the brick-machine.

The main objects of my invention are: first, to provide for dumping the molded brick upon the pallets at a safe and convenient station or position in advance of the receiving end of the conveyer, and for gently moving the loaded pallets into the conveyer to be carried off thereby; second, to cause the returning run of the conveyer to deposit the empty pallets at a convenient position for use in reloading; third, to allow the conveyer to make a quarter or other turn by taking the pallets off of or out of contact with the conveyer when making such turn and placing them in proper position on the conveyer after the turn; and, further, to provide very simple and efficient means for securing the results and performing the functions above stated.

My invention may be embodied with either a belt or cable-conveyer, cables being preferred.

Without restricting myself to the specific construction illustrated, the invention will hereinafter be fully described with reference to the accompanying drawings, which form a part of this specification, and will then be more particularly pointed out in the claims following this description.

In said drawings: Figure 1 is a top plan view of a portion of an apparatus embodying my invention, including part of an endless cable conveyer at its head or receiving end, a dump-board for dumping the green brick upon pallets, a gravity carrier for moving the loaded pallets from the dump-board onto the conveyer, and a gravity carrier for receiving and depositing empty pallets returned by the lower run of the conveyer. Fig. 2 is a side view of the subject-matter of Fig. 1. Fig. 3 is a longitudinal vertical sectional view of the dump-board, receiving end of the conveyer, and associated devices, showing the dump-board in its lowermost horizontal position; also indicating by dotted lines the upright position of the dump-board. Fig. 4 is a view similar to Fig. 3, but showing the dump-board when held by a treadle at a slightly elevated position. Fig. 5 is a front end view of the subject-matter of Figs. 1 to 4 inclusive. Fig. 6 is a side view of the foot or rear end of the endless cable-conveyer. Fig. 7 is a perspective view of a quarter turn of the conveyer. Fig. 8 is a detail plan view showing a modification of the dump-board.

In the drawings, A denotes the parallel cables of an endless cable-conveyer, passing around sheaves or pulleys B and C at the front and rear ends of the conveyer, and running over suitable guiding and supporting pulleys D at intermediate points. Power for running the conveyer may be applied by any appropriate means, and at either end of the conveyer; but in a brick plant the conveyer is usually for convenience run or driven from its front or head end, simply for the reason that the brick-machine and its engine or other motor from which power is supplied are located in proximity to such end. Therefore, in the illustrated construction, the shaft of the sheaves or pulleys B is, by way of example, shown provided with a pulley $b$ for application of power. At the opposite or rear end of the conveyer are, of course, arranged suitable devices for tensioning the cables; the sheaves or pulleys C, as represented in Fig. 6, being mounted in appropriate adjustable bearings C manipulated by adjusting screws F for tensioning the cables, in lieu of which any of the well known adjusting devices may obviously be substituted.

For dumping the fresh brick from molds upon pallets, I have represented at E a device known among brick-makers as a dump-board. Said device comprises a flat board or plate (or any equivalent member adapted to hold a pallet, such for example as an open frame), hinged or pivotally mounted upon any suitable standard or other support, as indicated by F, to permit the dump-board to be tilted up and let down horizontally, or swung from a substantially upright to a substantially horizontal position and vice versa. In dumping or overturning a mold of brick, the dump-board is first tilted to an upright or approximately upright position, as indicated by dotted lines in Fig. 3, and a pallet is placed flatwise upon or against said dump-board, the edge of the pallet resting on a suitable ledge or shoulder $c$ at the front of the dump-board, said ledge $e$ being down when the dump-board is upright. The operator then takes a mold of brick and places it facewise against or upon the pallet, at the same time throwing down the dump-board together with the pallet and mold to horizontal or approximately horizontal position; then he lifts off the mold, leaving the brick properly positioned upon the pallet, as well understood by persons familiar with the art to which my invention appertains.

Heretofore, in order to lessen manual labor in depositing the loaded pallet upon the conveyer, it has been customary to arrange the dump-board either above the conveyer so as to lower it and thereby deposit the pallet upon the cables, or else to locate the dump-board between the cables or between the pulleys B so that the pallet when resting on the dump-board in its lowermost horizontal position would be engaged by the cables or by the drive-sheaves, or by projections on the cables or drive-sheaves, and thereby carried off. Such prior mechanical expedients, while lessening manual labor, have however had the common disadvantage of requiring the attendants to operate the dump-board in immediate proximity to the drive-sheaves or pulleys, which was not only inconvenient because of the necessity of working between the drive-sheaves and avoiding contact therewith, but also exposed the men to more or less danger by contact with the running machinery, including the belting or driving gears for running the drive-sheaves of the conveyer. Furthermore, it was necessary to run the conveyer slowly in order to prevent too suddenly carrying off the pallet during the dumping operation, and even so the pallet would frequently be removed during such operation or before the brick had been completely dumped, or before the mold had been fully lifted off from the pallet, thereby causing more or less deformation and spoiling the brick. According to my present invention, however, the dump-board is stationed at a safe and convenient position in advance of the receiving end of the conveyer (either in alinement therewith or otherwise as most expedient), at a sufficient distance to avoid working in immediate proximity with the cable drive-sheaves and power applying mechanism; and the movement of the loaded pallet onto the conveyer is effected by a gravity-carrier G, comprising inclined rows of small antifriction wheels adapted to revolve freely and over which the pallet rides easily and gently from the dump-board to the upper runs of the conveyer-cables, which engage under and bear off the pallet so delivered thereto. As shown, the dump-board is arranged between two parallel rows of said antifriction wheels, which rows of wheels slant downwardly from the dump-board and pass respectively beside the drive-sheaves B at an approximate level with the upper runs of the conveyer-cables. When the dump-board is in its lowermost horizontal position, as represented in Figs. 2 and 3, its upper surface being just below the top perimeters of the wheels or rollers G, the ends of the pallet of brick will rest upon said wheels and hence pass by gravity to the conveyer. The wheels are shown journaled to supporting bars or rails $g$ which may be mounted upon any suitable standards, brackets or other supports, as indicated by $g^1$ and $g^2$ in the drawings. The dump-board is shown in alinement with or immediately in front of the receiving end of the conveyer, but if desired, by reason of the relative location of the brick-press, said dump-board can be offset to either side of the conveyer and the gravity-carrier can be made in an arc or curve to properly deliver the pallets to the conveyer.

As a modified arrangement, the dump-board may be constructed as a three-sided frame, as indicated by $E^1$, in Fig. 8, adapted to inclose the gravity-carrier between the arms $e^1$. The pallet resting on said arms $e^1$ would, upon lowering the dump-board to horizontal position, be received upon the antifriction wheels or rollers and ride thereon to the conveyer.

To prevent the pallet from leaving the dump-board until the bricks are properly shed of the mold, that is until the mold is lifted entirely off the bricks, I may provide a displaceable stop for limiting the lowering of the dump-board until removal of the mold. For this purpose, I show a treadle H, hinged or pivoted at $h$ to the standard F, or to any convenient support, and carrying an upright bar $h^1$. When dumping the brick-mold upon a pallet, the operator rests his foot on the treadle H, causing the point or head $h^2$ of the bar $h^1$ to take under and bear up the dump-board to a slight elevation, sufficient to support the ends of the pallet above or out of contact with the antifriction wheels or gravity carrier $b$, as shown in Fig. 4. As soon as the mold is lifted off from the brick, the operator releases the treadle, permitting the dump-board to lower, as shown in Fig. 3, so that the ends of the loaded pallet will rest on and ride off on the gravity carrier. However, by arranging the gravity-wheels practically but not absolutely on a level with the dump-board in its horizontal position, the mold can be lifted off without injury to the brick, and with only a slight gravity the pallet will move off after the brick has been shed of the mold, so that the apparatus can be practically operated without the treadle arrangement.

Usually, after a drying operation, the pallets of brick are removed from the drying-racks and replaced upon the conveyer for transportation to the kilns, or other depository. At the far end of the conveyer, or at such other point as may be expedient, the pallets of dried brick are taken off, and the brick are dumped or removed from the pallets, and the empty pallets are replaced upon the lower run of the conveyer and returned thereby to the original loading station. For receiving and delivering the empty pallets, as they are returned by the lower run of the conveyer, I provide a gravity carrier J, shown in Figs. 1 and 2, comprising two inclined rows of tracks of small antifriction wheels or rollers, arranged in such relation to the lower runs of the cables that the returning pallet will ride onto said gravity carrier at its receiving end and move over the wheels by gravity, assisted by the momentum imparted to the pallet, and be discharged from the conveyer; the gravity carrier being also arranged in an arc or curve so as to discharge the pallets at the side of the conveyer. This device is preferably located between the drive-sheaves B and the first set of intermediate supporting pulleys D. As shown, the lower runs of the cables pass over the lower pulley D at a higher elevation than the adjacent end of the gravity carrier J, while the cables pass under the drive-sheaves B at a lower elevation. This permits the receiving end of the gravity carrier J to be placed at an approximate level with the cables so as to properly take the pallet from the cables, while yet the gravity carrier inclines downwardly toward its discharging end and passes over the lower runs of the cables at one side. The antifriction wheels are shown journaled to supporting bars or rails $j$, which may be supported on suitable standards $j^1$ or otherwise.

In practical operation of the apparatus, one man is usually assigned to the operation of the dump-board, so as to take the mold of bricks delivered from the brick-press or molding machine and dump the bricks upon a pallet. Another attendant supplies the pallets. He places a pallet on the dump-board, in position to receive a mold of brick, as fast as a previously loaded pallet is carried off. It will thus be seen that the gravity carrier J is arranged so as to discharge or deliver the empty pallets at a convenient position to be taken by this attendant for use at the dump-board.

Inasmuch as the kilns are usually located out of line with the conveyer, it has generally been necessary, prior to my invention, to remove the bricks from the far end of the conveyer, just beyond the far ends of the racks, and there load the bricks on trucks, cars, or upon another conveyer, for delivery to the kilns; the empty pallets being placed upon the lower runs of the conveyer and returned as aforesaid. It is far preferable, however, to extend the conveyer laterally to the kilns, making a quarter turn or such other turn as necessary. To enable this to be done, and to afford practicable means for carrying the pallets around the turn, I have provided a construction as shown in Fig. 7, wherein the conveyer makes a turn by passing its cables around suitable guide-pulleys L, while the pallets are carried over the turn by gravity-carriers M, comprising small anti-friction wheels or rollers arranged in curved lines or rows, so as to receive the pallets from the conveyer just before the turn and to deliver the pallets upon the conveyer just beyond the turn. There are two of such gravity-carriers, one for transferring the loaded pallets over the turn of the upper run of the conveyer, and one for transferring the empty pallets over the turn of the lower run of the conveyer. The receiving and discharging ends of the gravity-carriers are respectively located on approximate levels with the conveyer, and the guide-pulleys L are mounted below the gravity-carriers. Inasmuch as the receiving end of the upper gravity-carrier is at the same side of the turn as the discharging end of the lower gravity-carrier, the two sets of wheels or gravity-carriers, slanting respectively from their receiving to their delivery ends, are downwardly inclined in opposite directions. To meet this condition, the upper run of the conveyer falls to a lower level after the turn, while the lower run of the conveyer is at a higher level; which arrangement is effective by proper positioning of the pulleys D. Hence, the loaded pallets, passing over the upper run of the conveyer, are carried by the upper set of gravity wheels to a lower level; while the returning empty pallets passing on the lower run of the conveyer are likewise carried by the lower set of gravity wheels to a lower level. It will thus be seen that the pallets of dried brick, when taken from the racks and placed upon the cables, may be transported thereby directly to the kilns, and the empty pallets may be returned from the kilns; thus eliminating an intermediate removal and loading of the brick onto a separate carrier. The wheels M are journaled to supporting rails or bars m which, together with the bearings for the pulleys L, may be mounted in any suitable supporting frame, a practicable construction being represented in Fig. 7 of the drawings. The gravity carriers or roller tracks are inclined in going around the turn, that is the outer row of wheels is slightly higher (desirably about three-quarters of an inch) than the inner row of wheels. The same inclination should be applied to the roller track of the gravity-carrier J for delivering the empty pallet at the receiving end of the conveyer.

I do not desire to be understood as limiting myself to the specific construction herein illustrated and described, since various modifications can be made in the details of construction and arrangement of parts, and the invention may be embodied in other practicable forms of apparatus without departing from the principle thereof.

I do not desire to be essentially restricted to the specific uses herein set forth, since my invention may be adapted for handling and conveying trays of other plastic articles or substances, as well as other things than trays or pallets.

I claim as my invention and desire to secure by Letters Patent.

1. The combination, with a conveyer, of a hinged or tilting dump-board for dumping brick from a mold upon a pallet located away from the conveyer, and a gravity-carrier extending from the dump-board to the conveyer and arranged in position to receive or support the loaded pallet when lowered to approximately horizontal position by the dump-board and allow said pallet to ride thereover onto the conveyer.

2. The combination, with a conveyer, of a dump-board in advance of the receiving end of the conveyer, and a gravity carrier arranged between the dump-board and receiving end of the conveyer and in position to receive the loaded pallet when lowered by the dump-board and to ride thereover onto the conveyer.

3. The combination, with an endless conveyer for bearing off pallets of bricks placed upon the upper run of said conveyer at its receiving end and returning empty pallets on its lower run, of a gravity-carrier associated with said lower run of the conveyer near the receiving end of the conveyer, said gravity-carrier having its higher end arranged in position to receive the pallets returned by the lower run of the conveyer and said gravity-carrier slanting downward over and curving to one side of said lower run of the conveyer to allow said pallets to ride thereover off from the conveyer.

4. The combination, with a conveyer, of a gravity-carrier provided at an intermediate portion of the conveyer for discharging pallets brought thereto by the conveyer, the conveyer being downwardly-inclined in the direction of its travel under said gravity-carrier, the higher and receiving end of said gravity-carrier being positioned to receive the pallets from the conveyer and said gravity-carrier being curved and passing at a lower level over and off to one side of the conveyer, for delivering the pallets to the side.

5. The combination of a traveling conveyer supported and guided to make a turn, and having a higher elevation at the approach than at the end of the turn and a curved gravity-carrier for transferring pallets carried by the conveyer around the turn out of contact with the conveyer, said gravity-carrier having its higher and receiving end positioned to receive the pallets brought thereto by the approaching run of the conveyer and having its lower end positioned to deliver the pallets upon the departing run of the conveyer.

6. The combination of an endless conveyer supported and guided to make a turn, the upper run of the conveyer being higher as it approaches the turn and the lower run being higher as it approaches the turn in the opposite direction, and oppositely inclined curved gravity-carriers arranged in association with the upper and lower runs of the conveyer for receiving pallets brought thereto by the approaching runs and transferring said pallets over or around the turn and placing them upon the departing runs of the conveyer.

In testimony whereof I affix my signature, in presence of two witnesses.

WILLIAM R. MARTIN.

Witnesses:
RALPH V. ALEXANDER,
G. B. KELLER.